United States Patent [19]

Lipp et al.

[11] Patent Number: 4,684,480

[45] Date of Patent: Aug. 4, 1987

[54] CERAMIC BONDED NEUTRON ABSORBER PLATES OF BORON CARBIDE AND FREE CARBON

[75] Inventors: Alfred Lipp, Bad Worishofen; Klaus Reinmuth, Durach; Detlef von Struensee, Kempten, all of Fed. Rep. of Germany

[73] Assignee: Elektroschmelzwerk Kempten GmbH, Munich, Fed. Rep. of Germany

[21] Appl. No.: 670,760

[22] Filed: Nov. 13, 1984

[30] Foreign Application Priority Data

Jan. 31, 1984 [DE] Fed. Rep. of Germany ....... 3403257

[51] Int. Cl.$^4$ .................... G21F 1/06; C04B 35/68
[52] U.S. Cl. .................... 252/478; 250/517.1; 250/518.1; 250/519.1; 264/29.1; 501/91
[58] Field of Search .................... 252/478; 250/515.1, 250/517.1, 518.1, 519.1; 106/43, 56; 264/29.1; 175/DIG. 2

[56] References Cited

U.S. PATENT DOCUMENTS

| | | | |
|---|---|---|---|
| 2,961,415 | 11/1960 | Axelrad | 250/515.1 X |
| 2,988,522 | 6/1961 | Smith et al. | 252/478 |
| 3,096,187 | 7/1963 | Weber | 250/515.1 X |
| 3,122,513 | 2/1964 | Dempsey | 252/478 |
| 3,126,352 | 3/1964 | Blair et al. | 252/478 |
| 3,133,887 | 5/1964 | Alliegro et al. | 252/478 |
| 3,153,636 | 10/1964 | Shanta | 252/478 |
| 3,245,880 | 4/1966 | Martin | 252/478 |
| 3,516,948 | 6/1970 | Cledat et al. | 252/478 |
| 4,156,147 | 5/1979 | Naum et al. | 250/515.1 |
| 4,198,322 | 4/1980 | Storm | 252/478 |
| 4,213,883 | 7/1980 | Owens | 252/478 |
| 4,225,467 | 9/1980 | McMurtry et al. | 252/478 |
| 4,252,691 | 2/1981 | Lipp et al. | 250/517.1 X |
| 4,293,598 | 10/1981 | Hortman et al. | 250/515.1 X |
| 4,313,973 | 2/1982 | McMurtry et al. | 250/515.1 X |

*Primary Examiner*—John F. Terapane
*Assistant Examiner*—Catherine S. Kilby
*Attorney, Agent, or Firm*—Burgess, Ryan and Wayne

[57] ABSTRACT

The invention is a ceramically-bonded large-area neutron absorber articles of low density having a space filling of about 40 to 60% by volume boron carbide+silicon carbide in a $B_4C:SiC$ ratio of about 9:1 to 1:9 and
about 10 to 20% by volume of free carbon, the remainder pores.

They have a density of from about 1.5 to 2.2 g/cm$^3$ and a flexural strength of from about 20 to 50 N/mm$^2$ at room temperature measured according to the 3-point method, which strength after the corrosion test of immersion for about 3000 hours in boiling water, drops by less than about 40% of the initial value. Graphite powder may optionally be included with a pulverulent organic resin binder and a wetting agent, molding the mixture under pressure at about room temperature, curing the resin binder at temperatures of up to about 180° C. and then coking the molded plates in the absence of air at temperatures of up to about 1000° C. under a controlled temperature program.

2 Claims, No Drawings

CERAMIC BONDED NEUTRON ABSORBER PLATES OF BORON CARBIDE AND FREE CARBON

BACKGROUND OF THE INVENTION

Neutron absorber materials in the form of large-area thin plates of pulverulent boron carbide embedded in a solid matrix and processes for their preparation are known. These absorber plates are particularly useful for the storage of burnt-out fuel elements from nuclear reactor plants.

Plates have been made from plastic-bonded neutron absorber materials consisting of boron carbide and if needed, diluents and a solid, irreversibly hardened phenolic polymer that is formed as a continuous matrix around the boron carbide particles and the diluent particles. The plates were prepared by blending coarse-grained boron carbide powders and diluents if required with a phenolic resin in solid or liquid form, molding the mixture and curing the phenolic resin binder at temperatures of up to 200° C. without coking. Diluents such as silicon carbide, graphite, amorphous carbon, alumina and silica, have been suggested. The diluents are generally used in particle sizes respectively equal to the boron carbide powder used (see EP-A-2227, EP-B-2276, EP-B-2715 and the corresponding U.S. Pat Nos. 4,225,467, 4,287,145, 4,198,322, 4,156,147 amd 4,215,883).

Although the known neutron absorber materials can be produced in the form of plates having a thickness greater than 2 mm, in view of the plastic matrix present, they are not resistant to high temperatures and have a tendency to emit gaseous substances under radiation.

The disadvantages of plastic-bonded neutron absorber materials are not encountered in ceramic-bonded neutron absorber materials that consist of boron carbide and free carbon. In the ceramic-bonded neutron absorber materials, the boron carbide portion can amount to up to 60% by volume. The ceramic-bonded materials are prepared by mixing boron carbide powders of a certain particle size distribution and a $B_2O_3$ content of less than about 0.5% by weight and optionally, graphite powder with an organic resin binder and a wetting agent, molding the mixture under pressure at about room temperature, curing the resin binder at temperatures in the range of about 180° C. and then coking the molded plates, with the exclusion of air, at temperatures up to about 1000° C. (see German Pat. No. 2,752,040 and U.S. Pat. No. 4,252,691).

Ceramic-bonded neutron absorber materials with a plate thickness greater than about 5mm have sufficient mechanical strength. The mechanical strength can be increased by the addition of graphite. However, it has been discovered that thinner plates having a thickness of about 2 mm and an edge length greater than about 500 mm, the mechanical strength is no longer sufficient when using pure boron carbide powder alone. by increasing the fine-grain portion of the boron carbide powder, it is possible to increase the flexural strength at room temperature. However, these plates are very susceptible to corrosion. As used herein, "susceptible to corrosion" means that their flexural strength drops by more than 50%, of the original value, after immersion for many hours in boiling water (2000–3000 hours). However, by adding graphite in amounts sufficient to increase the strength, difficulties in processing occur due to the highly oriented nature of this anisotropic material. The use of pressure during the forming of plates prevents aeration, which results, in lamination and cracking. Such plates are not dimensionally stable since they tend to warp during the coking operation.

BRIEF SUMMARY OF THE INVENTION

The problem to be solved is to make ceramic-bonded neutron absorber materials containing boron carbide and free carbon, which, in the form of thin and large-area plates have a boron content sufficient for neutron absorption, have good mechanical strength, are less susceptible to corrosion, and can be produced in a dimensionally stable form.

The problem is solved, according to the invention, by neutron absorber materials consisting essentially of from about 40 to 60% by volume boron carbide+silicon carbide in a $B_4C:SiC$ ration of about 9:1 to 1:9 and about 10 to 20% by volume of the free carbon and the rest pore volume. The neutron absorber material of the invention has a density of about 1.5 to 2.2 g/cm$^3$ and a flexural strength at room temperature of from about 20 to 50 N/mm$^2$, measured according to the 3-point method, which strength, after the corrosion test comprising immersion for 3000 hours in boiling water, drops by less than 40% of the original value.

The neutron absorber plates according to the invention preferably consist of boron, silicon and carbon with a composition by volume of up to about 40% by volume of boron carbide, at least about 10% by volume of silicon carbide together with from about 10 to 20% by volume free carbon and the rest as pore volume.

The best results with regard to density and physical properties are obtained with plates having a volume composition of:
about 15 to 25% by vol. boron carbide
about 25 to 35% by vol. silicon carbide and
about 10 to 20% by vol. of free carbon,
the rest pore volume.

DETAILED SUMMARY OF THE INVENTION

The neutron absorber plates of the present invention with ceramic bond can be produced in a known manner by mixing relatively fine-grained ceramic starting powders and optionally, graphite powder, with a pulverulent organic resin binder and a wetting agent, molding the mixture under pressure at about room temperature, curing the resin binder at temperatures of up to about 180° C. and then coking the molded plates with the exclusion of air at temperatures of up to about 1000° C. under a controlled temperature program.

To obtain the desired properties, the purity and fineness of the ceramic starting powders, boron carbide and silicon carbide are critical. The boron carbide powder used preferably has a purity of at least about 98% by weight, which, as used herein, means that the sum of boron and carbon percentage in the powder is at least about 98% by weight which corresponds to a boron content of from about 75 to 79% by weight. The maximum amount of $B_2O_3$ that can be present in the boron carbide from the start of the preparation is 0.5% by weight. Metallic impurities of up to about 1.0% by weight in total can be tolerated. The fluorine and chlorine content should not respectively exceed about 100 ppm. A particle size distribution preferably of
at least about 95% finer than 90 μm
at least about 90% finer than 80 μm
at least about 70% finer than 50 μm at least about 50% finer than 30 μm
at least about 30% finer than 20 μm
at least about 10% finer than 6 μm serves as a criterion for the fineness of the boron carbide powder used.

The silicon carbide powder used preferably has a SiC content of at least about 98% by weight, an oxygen content of at most about 0.5% by weight, a content of metallic impurities totalling not more than about 1.0% by weight and fluorine and chlorine respectively less than about 100 ppm. A particle size distribution preferably of at least about 95% finer than 40 μm
at least about 90% finer than 30 μm
at least about 70% finer than 20 μm
at least about 50% finer than 10 μm
at least about 30% finer than 7 μm
at least about 10% finer than 4 μm serves as a criterion for the fineness of the SiC powder used.

The pulverulent organic resin binders are preferably phenolformldehyde condensation products of the novolak or resole type which are practically free from metallic impurities and decompose at a temperature of about 1000° C. to form amorphous carbon in yields of approximately from 35 to 50%. As a wetting agent there can be used, for instance, furfural.

Optionally, graphite powder can be present. Preferably, the graphite powder has a particle size smaller than about 40 μm, and can be present in an amount of up to about 10% by weight based on the total weight of all starting materials. When present in this range, the cracking as mentioned before will not occur.

The starting materials are preferably used in the following amounts:

about 20 to 55% by weight of the boron carbide powder
about 55 to 20% by weight of the silicon carbide powder
about 0 to 10% by weight of the graphite powder
about 20 to 12% by weight of the organic resin binder and
about 5 to 3% by weight of the wetting agent.

For carrying out the process for preparing the neutron absorber plates according to the invention, the ceramic starting powders, boron carbide and silicon carbide and optionally graphite powder, together with the pulverulent organic resin binder and the wetting agent in the above indicated amounts, are homogeneously mixed to forming fluent powder. This powder is uniformly distributed in a plate mold such as a steel box mold and pressed at about room temperature with the aid of a hydraulic press under a pressure of about 25 to 30 MPa to form plates having a thickness between about 2 and 10 mm. The plates are then removed from the mold, stacked between plates made of an inert carrier material such as glass plates and cured at temperatures of up to about 180° C.

For thermal decomposition and coking of the resin binder, the previously molded plates must be heated to approximately 1000° C. For coking, the plates are preferably stacked between graphite plates and, in this form, subjected to the heating operation under a controlled rate of temperature increase, for example, about 120° C./hr with the exclusion of air. The temperature program (heating-dwelling-cooling) needed for the heating operation depends on the size of the previously molded plates. In a plate with dimensions of about 700×500 mm and a thickness of about 2 to 10 mm, the temperature difference within one plate should not exceed about 100° C. This can be accomplished, for example, by effecting the heating to a temperature of about 1000° C. over a period of time of at least 20 hours and by maintaining the final temperature for about at least 4 hours and then slowly cooling over a period of about 24 hours.

The stacked arrangement of the neutron-absorber plates between carrier plates of inert material that will not soften or melt at the working temperatures, practically completely prevents any warping of the plates during the curing operation and during the coking that follows. During the coking, the plates shrink only about 1% in length. After cooling, the plates are in the desired shape and all that is required for machining to the final measurement is simply to trim the edges.

The neutron absorber plates according to the invention are superior in comparison to the known materials consisting of ceramic-bonded pure boron carbide alone because of higher mechanical strength at room temperature and improved corrosion resistance. The use of silicon carbide powder having a greater amount of fine grains than boron carbide powder used is especially useful, since the drop in flexural strength after the corrosion test can be reduced to about 30%.

The use of graphite powder is not critical to obtain the improved properties. The quantitative limitation of the graphite powder which is optionally used, to a maximum of about 10% by weight based on the total weight of all the starting materials, provides neutron absorber materials according to the invention in the form of very thin plates having a thickness as small as about 2 mm and an edge length greater than about 550 mm that is dimensionally stable and can be machined without difficulties.

Because of their good mechanical strength, these thin plates can be easily handled and despite their low boron loading they still offer sufficient assurance for neutron absorption. In addition, they are resistant to ionizing radiation in the same manner as the known plates on a base of pure boron carbide alone. These thin plates are especially useful for "compact storage" which permits a compact arrangement of the spent fuel elements whereby the capacity of existing spent fuel element storage racks can be increased.

The object of the invention is explained in greater detail in the examples that follow. As ceramic starting powders, the following powder types have been used in the examples.

Boron carbide powder (A) contained 77.3% by weight B and 0.3% by weight $B_2O_3$ and had a particle size distribution of 100% finer than 100 μm
90% finer than 60 μm
70% finer than 40 μm
50% finer than 30 μm
30% finer than 20 μm and
20% finer than 15 μm Boron carbide powder (B) contained 78.8% by weight B, 0.24% by weight $B_2O_3$ and had a particular size distribution of 100% finer than 50 μm
90% finer than 15 μm
70% finer than 10 μm
50% finer than 8 μm
30% finer than 6 μm and
20% finer than 4 μm.

Silicon carbide powder (C) contained 98.4% by weight SiC and had a particle size distribution of 100% finer than 50 μm
90% finer than 15 μm
70% finer than 10 μm
50% finer than 8 μm
30% finer than 5 μm and
20% finer than 2 μm The graphite powder was a screened natural graphite fraction of 40 μm and finer.

The lexural strength was determined according to the 3-point method with samples which measured 45×4.5×3.5 mm, a span of 30 mm amd a rate of load application of 1.8 N/mm² per second. For the corrosion test, the plates were immersed for 2000 or 3000 hours in water near its boiling point, and the flexural strength was again determined. The percent decrease in the flexural strength refers to the initially measured value at room temperature.

EXAMPLE 1

28 parts by weight boron carbide powder (A),
65 parts by weight silicon carbide powder (C),
7 parts by weight graphite powder,
18 parts by weight phenolic resin powder and
6 parts by weight furfural were homogenously mixed. The powder mixture was pressed under a pressure of 28 MPa into plates 2 mm thick. The plates were stacked between glass plates and cured by heating for 15 hours at 180° C. The plates were then stacked between graphite plates and heated to 1050° C. in the absence of air, the time for heating to 1050° C. was 19 hours and the plates were held at this temperature for 7 hours.

Properties of the plates produced:

| | |
|---|---|
| density | 2.0 g/cm³ |
| boron content: | 19.0% by weight |
| | corresponds to 19.5% by volume $B_4C$ |
| silicon content: | 36.5% by weight |
| | corresponds to 32.5% by volume SiC |
| free carbon content: | 20.0% by weight |
| | corresponds to 18.0% by volume free C |
| $B^{10}$ loading: | near 0.014 g Boron 10/cm² |
| flexural strength: | 35 N/mm² |
| compression strength: | 60 N/mm² |
| modulus of elasticity: | 22,000 N/mm² |
| radiation resistance: | 10¹¹ rad (no measurable change in the flexural strength and the dimension) |
| flexural strength after immersion for 2000 hours in water at 93° C.: | 25 N/mm² |
| flexural strength after immersion for 3000 hours in water at 93° C.: | 24 N/mm² corresponds to a drop of 31.4% compared to the initial value. |

EXAMPLE 2

Under the same conditions as described in Example 1, the following homogeneous powder mixture was prepared and compressed and the plates cured and fired in the absence of air:

60 parts by weight boron carbide powder (B)
20 parts by weight silicon carbide powder (C)
10 parts by weight graphite powder
19 parts by weight phenolic resin powder and
6 parts by weight furfural.

Properties of the plates produced (2mm):

| | |
|---|---|
| density | 1.85 g/cm³ |
| boron content: | 41.0% by weight |
| | corresponds to 39.0% by volume $B_4C$ |
| silicon content: | 17.5% by weight |
| | corresponds to 14.5% by volume SiC |
| free carbon content: | 19.0% by weight |
| | corresponds to 16.0% by volume free C |
| $B^{10}$ loading: | near 0.028 g Boron 10/cm² |
| flexural strength: | 25 N/mm² |
| compression strength: | 50 N/mm² |
| modulus of elasticity: | 16.000 N/mm² |
| radiation resistance: | 10¹¹ rad (no measurable change the flexural strength and the dimensions) |
| flexural strength after immersion for 2000 hours in water at 93° C.: | 17.0 N/mm² |
| flexural strength after immersion for 3000 hours in water at 93° C.: | 16.0 N/mm² corresponds to a drop of 36% compared to the initial value. |

EXAMPLE 3

(for comparison)

Under the same conditions as described in Example 1, the following homogeneous powder mixture was prepared and compressed and the plate cured and fired in the absence of air.

93 parts by weight boron carbide powder (B)
7 parts by weight graphite powder
19 parts by weight pheonolic resin powder and
5 parts by weight furfural.

Properties of the plates produced (2 mm):

| | |
|---|---|
| density: | 1.70 g/cm³ |
| boron content: | 64.0% by weight |
| | corresponds to 55% by volume $B_4C$ |
| free carbon content: | 16.0% by weight |
| | corresponds to 12% by volume free carbon |
| $B^{10}$ loading: | 0.04 g Boron 10/cm² |
| flexural strength | 16 N/mm² |
| compression strength: | 50 N/mm² |
| modulus of elasticity: | 11.500 N/mm² |
| radiation resistance: | 10¹¹ rad (no measurable change in flexural strength and the dimensions) |
| flexural strength after immersion for 2000 hours in water at 93° C. | 8.5 N/mm² |
| flexural strength after immersion for 3000 hours in water at 93° C.: | 7.5 N/mm² corresponds to a drop of 52.3% compared to the initial value. |

We claim:
1. A ceramically bonded neutron absorber article of boron carbide and free carbon, comprising from about 40 to 60% by volume boron carbide+silicon carbide in $B_4C$:SiC ratio of from about 9:1 to 1:9 and from about 10 to 20% by volume of free carbon, the remainder being pores, having a density of from about 1.5 to 2.2 g/cm³ and a flexural strength of from about 20 to 50 N/mm² at room temperature, measured according to the 3-point method, which, after immersion for about 3000 hours in boiling water, drops by less than about 40% of the initial value.

2. A neutron absorber material according to claim 1, wherein the composition comprises
   about 15 to 25% by volume boron carbide,
   about 25 to 30% by volume silicon carbide and
   about 10 to 20% volume of the free carbon,
   the remainder pores.

* * * * *